(12) United States Patent
Van Dijk et al.

(10) Patent No.: US 8,621,649 B1
(45) Date of Patent: Dec. 31, 2013

(54) PROVIDING A SECURITY-SENSITIVE ENVIRONMENT

(75) Inventors: Marten Van Dijk, Somerville, MA (US); Ari Juels, Brookline, MA (US); Brian William Fitzgerald, Fiskdale, MA (US); George Matthews, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 342 days.

(21) Appl. No.: 13/077,153

(22) Filed: Mar. 31, 2011

(51) Int. Cl.
*H04L 29/06* (2006.01)

(52) U.S. Cl.
USPC .................................. 726/27; 726/1; 713/150

(58) Field of Classification Search
USPC .......................................................... 713/27
See application file for complete search history.

(56) References Cited

U.S. PATENT DOCUMENTS

| | | | |
|---|---|---|---|
| 6,871,283 B1 | 3/2005 | Zurko et al. | |
| 7,457,951 B1 | 11/2008 | Proudler et al. | |
| 7,634,807 B2 | 12/2009 | Yan et al. | |
| 7,707,411 B2 | 4/2010 | Bade et al. | |
| 7,707,413 B2 | 4/2010 | Lunt et al. | |
| 7,996,687 B2 | 8/2011 | Arndt et al. | |
| 8,086,852 B2 | 12/2011 | Bade et al. | |
| 8,181,239 B2 | 5/2012 | Pandya | |
| 2003/0004734 A1* | 1/2003 | Adler et al. | 705/1 |
| 2003/0039234 A1* | 2/2003 | Sharma et al. | 370/338 |
| 2006/0123462 A1* | 6/2006 | Lunt et al. | 726/1 |
| 2008/0082354 A1* | 4/2008 | Hurry et al. | 705/1 |

\* cited by examiner

*Primary Examiner* — Edward Zee
*Assistant Examiner* — Yogesh Paliwal
(74) *Attorney, Agent, or Firm* — BainwoodHuang

(57) ABSTRACT

A technique provides a security-sensitive environment. The technique involves establishing a first secure channel from a trusted server to a first data source $D_A$. The technique further involves establishing a second secure channel from the trusted server to a second data source $D_B$. The technique further involves, while the trusted server performs a set of collaborative operations in which the trusted server (i) accesses the first data source through the first secure channel (ii) accesses the second data source through the second secure channel, and (iii) generates a set of collaborative results based on information from the first and second data sources (i.e., the output of $f(D_A,D_B)$), running a set of security policy compliance operations in the trusted server to inhibit unauthorized leakage of data in the set of collaborative results.

24 Claims, 8 Drawing Sheets

PROVIDING A SECURITY-SENSITIVE ENVIRONMENT

BACKGROUND

It is common for a retailer to enlist the assistance of an advertising specialist to match various promotions to the retailer's customers. The advertising specialist may have demonstrated a methodology for smartly assigning such promotions, and the retailer may wish to employ that methodology in order to increase sales.

For this purpose, the retailer likely maintains a database of customer information. For example, in the context of a physical store which identifies walk-in customers using tokens (i.e., identifiers in place of actual credit card numbers and/or customer names), the retailer's database may store its customers spending habits such as what types of products each customer purchases, average purchase amount, purchasing frequency, zip code to determine customer demographics, and so on. As another example, in the context of an online store which identifies web shoppers via email addresses or the like, the retailer's database may store customer shipping addresses, shopping habits (i.e., listings of which items were viewed), browsing times, and so on.

When the time comes for the advertising specialist to match promotions to particular customers, the advertising specialist may read the customer information from the retailer's database, and apply special algorithms (e.g., filtering rules, analysis tools, matching routines, etc.) to select a particular advertisement for each customer. The advertising specialist then supplies these selections back to the retailer for distribution to the actual customers, e.g., the physical store may provide smartly-assigned discount coupons with sales receipts when its walk-in customers visit the check out counter, the online store may provide smartly-assigned banner ads on web pages and email promotions, and so on.

SUMMARY

Unfortunately, there are deficiencies to the above-described conventional data sharing approach which involves a retailer providing its customer database to an advertising specialist. For example, the retailer may wish to maintain a level of privacy on behalf of its customers, and simply providing the retailer's database to the advertising specialist provides an opportunity for the advertising specialist to steal customer information. Along these lines, the advertising specialist may then be able to pass that customer information to another retailer without authorization.

As another example, the advertising specialist may worry that it is giving the retailer too much access or insight into its methodology and that such access will result in the retailer stealing or perhaps easily deducing its methodology. If the retailer is able to acquire the methodology, the retailer will then be able to smartly assign promotions to its customers without further need of the advertising specialist.

In contrast to the above-described conventional data sharing approach which involves a retailer providing its customer database to an advertising specialist and the retailer having too much access to the methodology of the advertising specialist, improved techniques are directed to providing a security-sensitive environment which allows multiple parties to work efficiently and effectively together with certain pre-established safeguards in place to prevent unauthorized leakage of data from one party to another. Such safeguards inhibit data leakage at a variety of levels and provide all parties with a high level of confidence that their data is secure. With such safeguards in place, the parties are able to collaborate in a robust and reliable manner to generate a useful set of collaborative results (e.g., promotions which are smartly assigned to customers).

It should be understood that these improved techniques enable a Trusted Computing Environment (TCE) to perform computations over a database $D_A$ from A and another database $D_B$ from B in a manner which does not leak sensitive data from databases $D_A$ and $D_B$. In mathematical terms, such techniques enable the TCE to compute $f(D_A, D_B)$ where f meets some pre-established confidentiality policy agreed to by A and B. The TCE emits no non-negligible information about $D_A$ and $D_B$ except $f(D_A, D_B)$.

To this end, Parties A and B initially agree on how f implements the pre-defined safeguards. Along these lines, the parties are able to closely inspect f to verify the soundness of f, i.e., to trust that f does not leak their data. Once the parties have made such verification, the parties allow a trusted server to access their data, i.e., $D_A$, $D_B$, over secure channels which are generated via interaction with the trusted server. In some arrangements, the trusted server produces a certificate stating that the trusted server properly runs f.

It should be understood that $D_A$ and $D_B$ can be data or code. For example, $D_A$ can be a private customer database while $D_B$ is a proprietary data mining algorithm that outputs targeted advertisements.

One embodiment is directed to a method of providing a security-sensitive environment. The method includes establishing a first secure channel from a trusted server to a first data source. The method further includes establishing a second secure channel from the trusted server to a second data source. The method further includes running a set of security policy compliance operations in the trusted server to inhibit unauthorized leakage of data in a set of collaborative results. The trusted server runs the set of security policy compliance operations while the trusted server performs a set of collaborative operations in which the trusted server (i) accesses the first data source through the first secure channel (ii) accesses the second data source through the second secure channel, and (iii) generates the set of collaborative results based on information from the first and second data sources. Accordingly, the parties are able to obtain a set of collaborative results without unnecessarily divulging sensitive data to each other.

Another embodiment is directed to a security-sensitive platform. Yet another embodiment is directed to a computer program product for providing a security-sensitive platform. Further embodiments are directed to related systems, processes, specialized circuitry, and so on.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

An improved technique is directed to providing a security-sensitive environment which allows multiple parties to work efficiently and effectively together with certain pre-established safeguards in place to prevent unauthorized leakage of data from one party to another. Such safeguards inhibit data leakage at a variety of levels and provide the parties with a high level of confidence that their data is secure. With such safeguards in in place, the parties are able to collaborate in a robust and reliable manner to generate a useful set of collaborative results (e.g., advertisements which are smartly assigned to customers).

Figure 1:
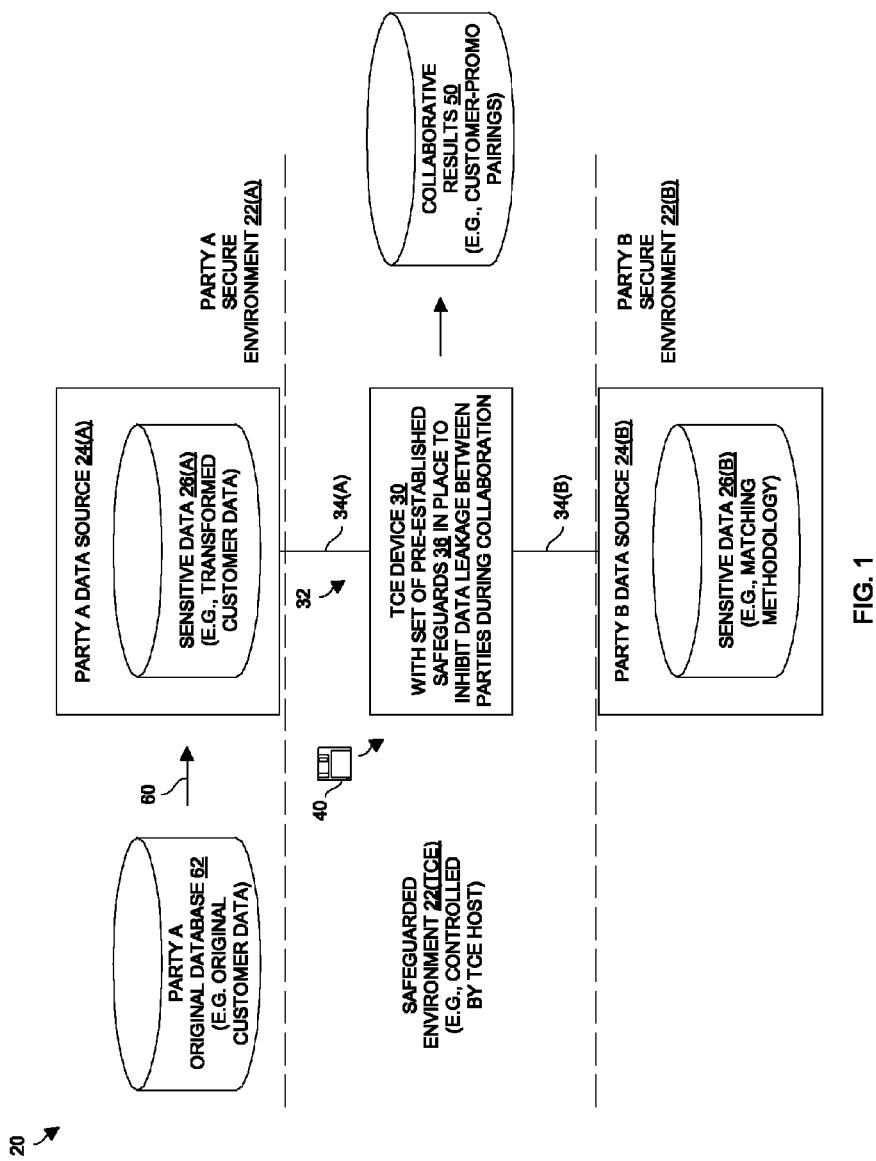
FIG. 1 is a block diagram of an electronic system which includes a trusted computing environment (TCE) device.

FIG. 1 is a block diagram of an electronic system 20 which inhibits data leakage between parties during collaboration. The electronic system 20 includes multiple secure environments 22(A), 22(B), 22(TCE) (collectively, secure environments 22). In particular, Party A controls secure environment 22(A). Similarly, Party B controls secure environment 22(B). Furthermore, a Trusted Computing Environment (TCE) Host controls environment 22(TCE).

The secure environment 22(A) includes a data source 24(A) which stores Party A's sensitive data 26(A). The data source 24(A) may be in the form of a standalone data storage assembly which is created and managed and maintained by Party A.

Likewise, the secure environment 22(B) includes a data source 24(B) which stores Party B's sensitive data 26(B). Again, the data source 24(B) may be in the form of a standalone storage assembly which is created and managed and maintained by Party B.

The TCE environment 22(TCE) includes a TCE device 30 and a communications infrastructure 32 which enables the TCE device 30 to establish a secure channel 34(A) to the data source 24(A), and another secure channel 34(B) to the data source 24(B). The TCE device 30 is equipped with a set of pre-established safeguards 36 to inhibit data leakage between parties during collaboration. The TCE device 30 may take the form of a server (e.g., a processing or compute engine) which is managed and maintained by the TCE Host.

In some arrangements, the TCE device (or trusted server) 30 is implemented using a computer and a computer program product 40 which provides a set of instructions (e.g., executable code, interpretable code, etc.) to the computer. In particular, the computer program product 40 includes a non-transitory computer readable storage medium that stores a set of instructions which, when performed by the computer, cause the computer to operate as the TCE device 30 which inhibits data leakage between parties during collaboration. Suitable forms for such a non-transitory computer readable storage medium medium which delivers such a set of instructions in a non-volatile manner include CD-ROMs, DVDs, disk memory, tape memory, flash memory, and the like.

During operation, the TCE device 30 establishes a first secure channel 34(A) to Party A's data source 24(A), and a second secure channel 34(B) to Party B's data source 24(B). The various data sources 24(A), 24(B) and the TCE device 30 can employ encryption keys to ensure privacy through each channel 34(A), 34(B). Additionally, the various data sources 24(A), 24(B) can exchange signature keys with the TCE device 30 (e.g., one time passcodes, or the like) for authentication purposes. Accordingly, the TCE device 30 now has the ability to access the sensitive data 26(A) on Party A's data source 24(A) via secure communications (e.g., authorized queries) through the secure channel 34(A). Similarly, the TCE device 30 now has the ability to access the sensitive data 26(B) on Party B's data source 24(B) via secure communications through the secure channel 34(B).

With the secure channels 34(A), 34(B) in place, the TCE device 30 performs a set of collaborative operations in which the TCE device 30 accesses the sensitive data 26(A), 26(B) from the data sources 24(A), 24(B) and generates a set of collaborative results 50 based on the sensitive data 26(A), 26(B). While the TCE device 30 performs the set of collaborative operations, the TCE device 30 runs a set of security policy compliance operations which impose the set of pre-established safeguards 36 to prevent unauthorized leakage of data in the set of collaborative results 50.

At this point, it should be understood that the electronic system 20 is well suited for a variety of collaborative situations. For example, in the context of a data mining endeavor between a merchant and an advertising company, the sensitive data 26(A) may be a database of customer data ($D_A$) which belongs to a merchant, and the sensitive data 26(B) may be a methodology or specialized advertising data ($D_B$) which belongs to an advertising company. In this example, the TCE Host is entrusted to provide a processing platform to generate, as the set of collaborative results 50, a set of customer-promotion pairings (i.e., advertisements which are smartly assigned to the merchant's customers) based on the customer data and the methodology (i.e., the output of $f(D_A, D_B)$). During such operation, such operation, the TCE device 30 imposes the set of pre-established safeguards 36 to prevent unauthorized data leakage between the parties.

As an added precaution, one or more of the parties may transform its original data into the sensitive data which is made available within the environment 22(TCE). The arrow 60 in FIG. 1 represents the process of transforming original data from an original database 62 to form the sensitive data 26(A) which is shared with the environment 22(TCE). Such transformation operations may include data generalizing operations, filtering operations, masking operations, combinations thereof, etc. Although not shown for simplicity, it should be understood that a similar transformation task can be performed by Party B. Further details will now be provided with reference to FIG. 2.

Figure 2:
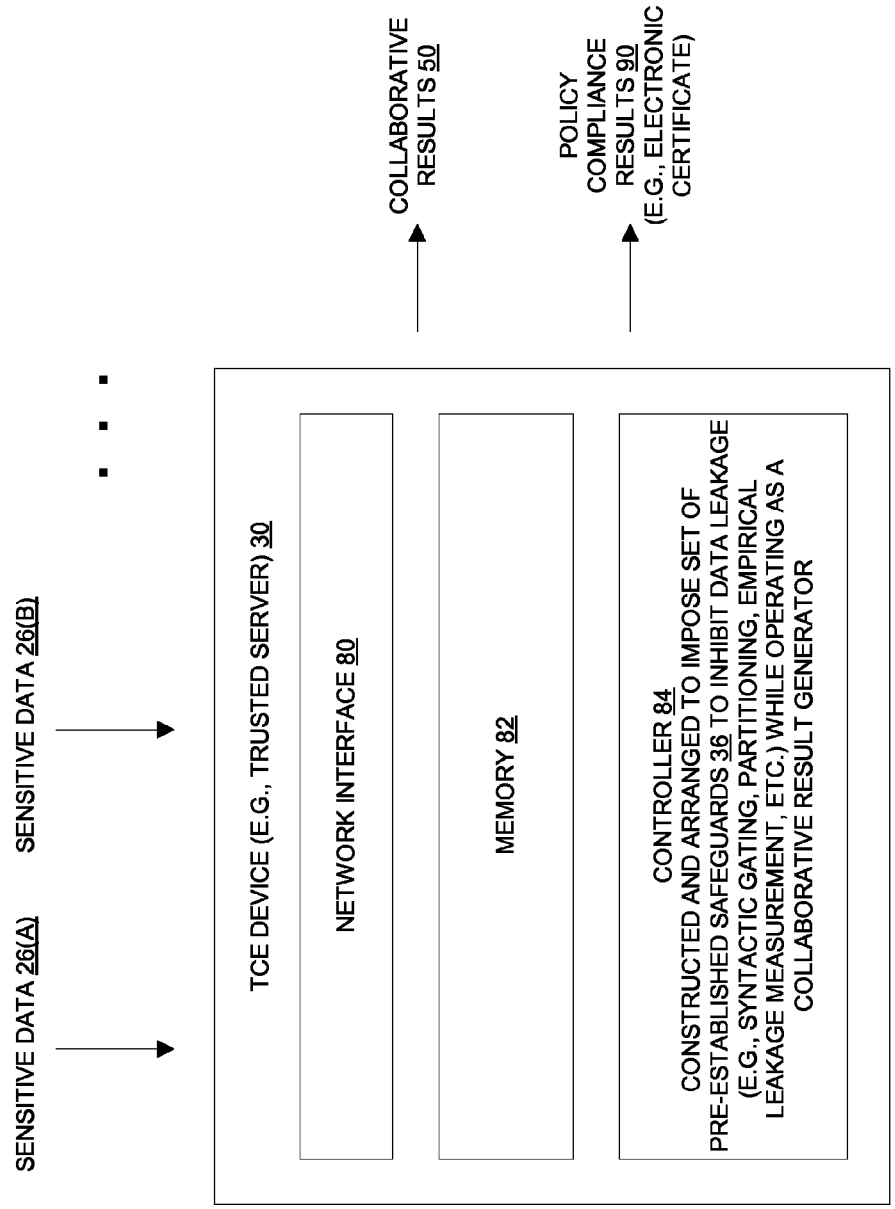
FIG. 2 is a block diagram of the TCE device of FIG. 1.

FIG. 2 shows particular details of the TCE device 30 of the electronic system 20 (also see FIG. 1). The TCE device 30 includes a network interface 80, memory 82, and a controller 84.

The network interface 80 is responsible for establishing the secure channels 34(A), 34(B) which enable the TCE device 30 to access the sensitive data 26(A), 26(B) from the data sources 24(A), 24(B). In some embodiments, the TCE device 30 uses cryptographic techniques (e.g., employs public/private keys, etc.) to form the secure channels 34(A), 34(B).

The memory 82 is constructed and arranged to buffer the sensitive data 26(A), 26(B) from the data sources 24(A), 24(B) which is received through the network interface 80 and to deliver the sensitive data 26(A), 26(B) to the controller 84 for processing. The memory 82 is further constructed and arranged to provide a processing workspace for intermediate results, and to store the set of collaborative results 50 prior to delivery to one or more of the parties. The memory 82 is further constructed and arranged to store other information as well such as a set of policy compliance results 90 for examination by the parties. Such policy compliance results 90 offer a level of assurance that the set of collaborative results 50 do not leak the sensitive data 26(A), 26(B) in an unauthorized manner.

The controller 84 is constructed and arranged to generate the set of collaborative results 50 and the set of policy compliance results 90. Along these lines, the collaborative results 50 do not unnecessarily reveal the sensitive data 26(A), 26(B) due to the controller imposing the pre-established safeguards 36 during operation.

As mentioned earlier, the set of collaborative results 50, which is provided by the TCE device 30, is a result of computations over a database $D_A$ from A (i.e., the sensitive data 26(A)) and another database $D_B$ from B (i.e., the sensitive data 26(B)) in a manner which does not leak sensitive data from databases $D_A$ and $D_B$. Such techniques involve the TCE device 30 computing $f(D_A,D_B)$ while remaining compliant with the pre-established safeguards 36. As a result, the TCE device 30 is able to provide a trusted execution environment which emits no non-negligible information about $D_A$ and $D_B$ except $f(D_A,D_B)$. Such pre-established safeguards 36 include a syntactic gating, a partitioning, an empirical leakage measurement, etc. Further details will now be provided with reference to FIGS. 3-6.

Syntactic Gating

The TCE device 30 is equipped to perform syntactic gating operations to ensure that the collaborative results 50 are compliant with a syntactic gating policy (i.e., one of the pre-established safeguards 36). Along these lines, while the TCE device 30 performs $f(D_A,D_B)$ using $D_A$ from Party A and $D_B$ from Party B, the TCE device 30 checks whether the output off satisfies a pre-specified format 100. Such a format 100 is constructed and arranged to prevent explicit or flagrant release of sensitive data from $D_A$ and/or $D_B$ (e.g., an overt release of a salary amount or an address of a particular customer, etc.). If any of the collaborative results 50 violates the pre-specified format 100, a potential leak of sensitive data may exist.

Figure 3:
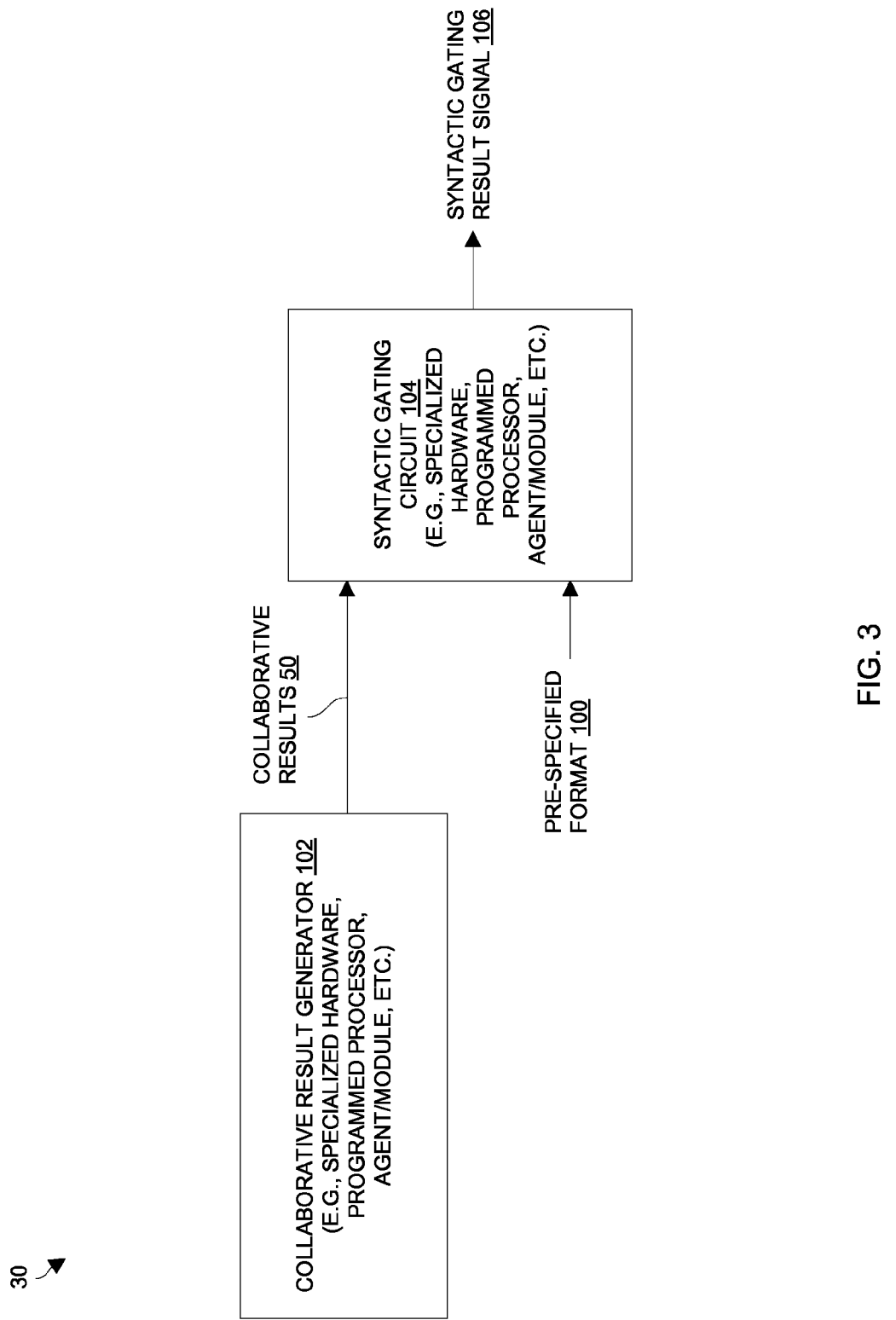
FIG. 3 is a block diagram illustrating a syntactic gating operation performed by the electronic system of FIG. 1.

As shown in FIG. 3, the TCE device 30 includes a collaborative result generator 102 and a syntactic gating circuit 104. The collaborative result generator 102 performs $f(D_A,D_B)$ to generate, as the output of f, the set of collaborative results 50 from $D_A$ and $D_B$. The syntactic gating circuit 104 compares each collaborative result 50 to the pre-specified pre-specified format 100. If the syntactic gating circuit 104 determines that every collaborative result 50 complied with the format 100, the syntactic gating circuit 104 outputs a syntactic gating result signal 106 having a value which indicates compliance with the syntactic gating policy. This outcome provides the parties with a level of assurance that there is no explicit release of sensitive data in the set of collaborative results 50 (also see the policy compliance results 90 in FIG. 2).

However, if the syntactic gating circuit 104 determines that there is at least one collaborative result 50 which does not satisfy the pre-specified format 100, the syntactic gating circuit 104 outputs a syntactic gating result signal 106 with a different value indicating that a breach of security may have occurred. In this situation, the TCE Host may decide not to allow the parties to have access to the collaborative results 50 since one or more collaborative results 50 may include explicit sensitive data.

In some arrangements, the syntactic gating circuit 104 is implemented using specialized hardware. In other arrangements, the syntactic gating circuit 104 is implemented using processing circuitry running a specialized set of instructions (e.g., see the computer program product 40 in FIG. 1).

It should be understood that the TCE device 30 may impose multiple syntactic gating policies on the collaborative results 50 to confirm compliance with multiple pre-specified formats. Furthermore, the TCE device 30 may impose syntactic gating using multiple stages or across multiple syntactic gating circuits 104. Such configurations easily enable performance of advanced/complex syntactic gating operations as well as provide flexibility in terms of implementation.

Partitioning

The TCE device 30 is equipped to perform partitioning operations to ensure that the collaborative results 50 are compliant with a partitioning policy (i.e., one of the pre-established safeguards 36). Along these lines, as the TCE device 30 performs $f(D_A,D_B)$ to generate the set of collaborative result 50, the TCE device 30 deletes all state between the individual operations which generate each collaborative result 50. Such resetting (or resetting (or rewinding) back to a consistent initial start condition prevents subtle dissemination of sensitive data over multiple collaborative results 50. Without removing such state, it would be possible for f to correlate information across the collaborative results 50 in invasive ways (e.g., to a conceal release of a salary amount or an address of a particular customer, etc.).

Figure 4:
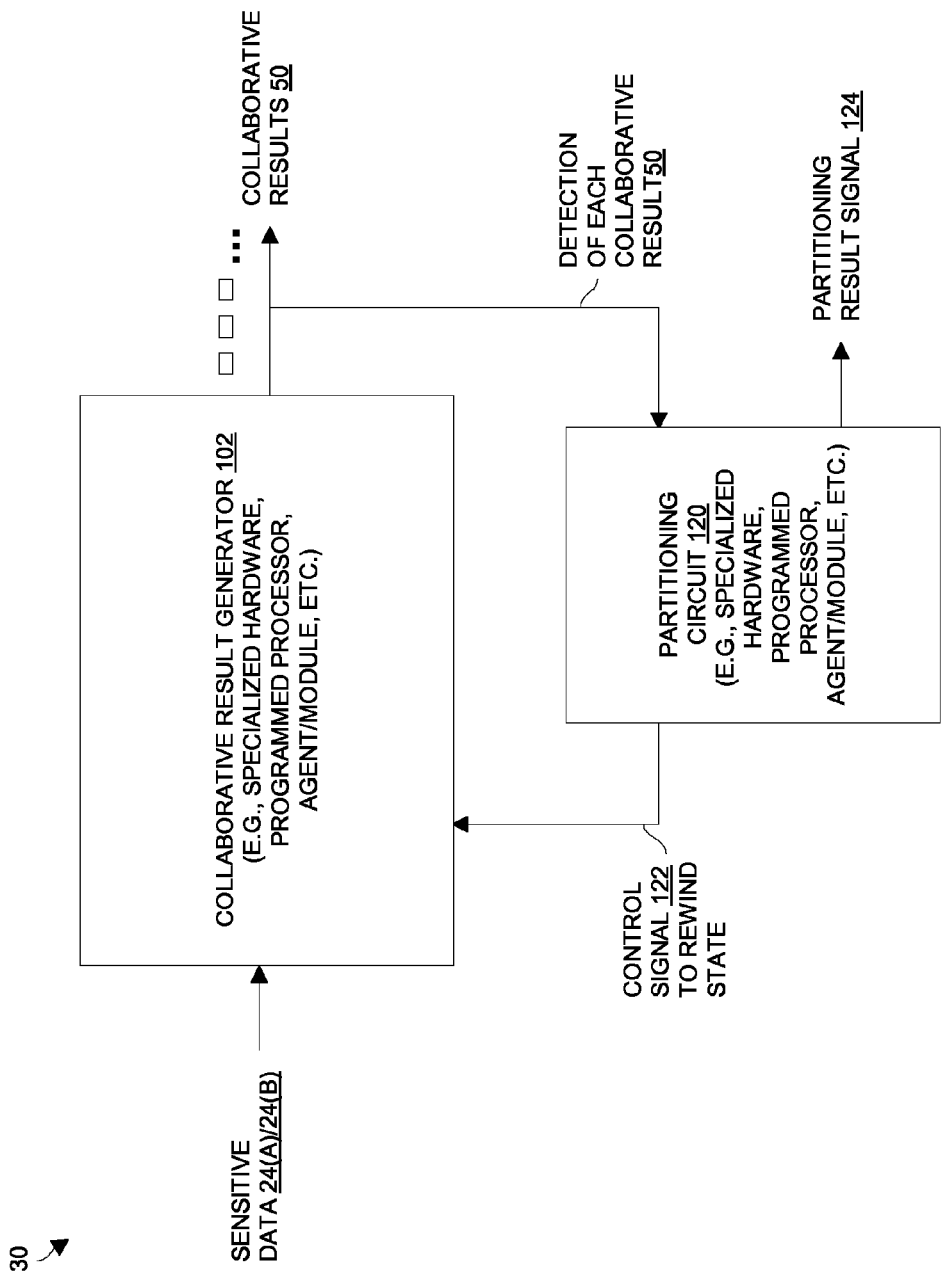
FIG. 4 is a block diagram illustrating a partitioning operation performed by the electronic system of FIG. 1.

As shown in FIG. 4, the TCE device 30 includes a collaborative result generator 102 and a partitioning circuit 120. The collaborative result generator 102 performs $f(D_A,D_B)$ to generate the set of collaborative results 50 from $D_A$ and $D_B$ (see the sensitive data 24(A), 24(B) from Parties A and B). In particular, the collaborative result generator 102 begins at an initial state and generates a first collaborative result 50. The partitioning circuit 120 detects generation of the first collaborative result 50 and outputs a control signal 122 to rewind the state of the collaborative result generator 120 back to the initial state before the collaborative result generator 102 generates a second collaborative result 50.

In response to the control signal 122, the collaborative result generator 102 returns to the initial state and then generates a second collaborative result 50. The partitioning circuit 120 then detects generation of the second collaborative result 50 and outputs the control signal 122 to rewind the state of the collaborative result generator 120 back to the initial state before the collaborative result generator 102 generates another collaborative result 50, and so on. Accordingly, each operation by the collaborative result generator 102 to generate a collaborative result 50 is independent of the others. Such inflicted "amnesia" on the collaborative result generator 102 prevents the collaborative result generator 102 from correlating information over multiple collaborative results 50.

Additionally, if the partitioning circuit 120 determines that it successfully reset the collaborative result generator 102 prior to each operation to generate a collaborative result 50, the partitioning circuit 120 outputs a partitioning result signal 124 having a value which indicates compliance with the partitioning policy (also see the policy compliance results 90 in FIG. 2). With such known compliance with the partitioning policy, the parties now have a level of assurance that there is no unauthorized release of correlating information in the set of collaborative results 50.

However, if the partitioning circuit 120 is unable to make that determination, the partitioning circuit 120 outputs the partitioning result signal 124 with a different value indicating that a breach of security may have occurred. In this situation, the TCE host may decide not to allow the parties to have access to the collaborative results 50 since unsuccessful partitioning between collaborative result generation operations may have allowed multiple collaborative results 50 to conceal and leak sensitive data.

In some arrangements, the partitioning circuit 120 is implemented using specialized hardware. In other arrangements, the partitioning circuit 120 is implemented using processing circuitry running a specialized set of instructions (e.g., see the computer program product 40 in FIG. 1).

Empirical Leakage Measurement

The TCE device 30 is equipped to perform empirical leakage measurement operations to ensure that the collaborative results 50 are compliant with an empirical leakage measurement policy (i.e., one of the pre-established safeguards 36). Along these lines, when the TCE device 30 performs $f(D_A, D_B)$ to generate the set of collaborative results 50, the TCE device 30 reruns $f(D_A, D_B)$ on a subset of $D_A$ and/or $D_B$. The TCE device 30 then compares the collaborative results 50 from the initial run which used all of $D_A$ and $D_B$ to the collaborative results 50 from the rerun which used the subset of $D_A$ and/or $D_B$. If the collaborative results 50 from both runs are significantly different, the TCE device 30 concludes that the collaborative results 50 are somehow biased or skewed based on particular entries in $D_A$ and $D_B$ thus potentially leaking sensitive data.

Figure 5:
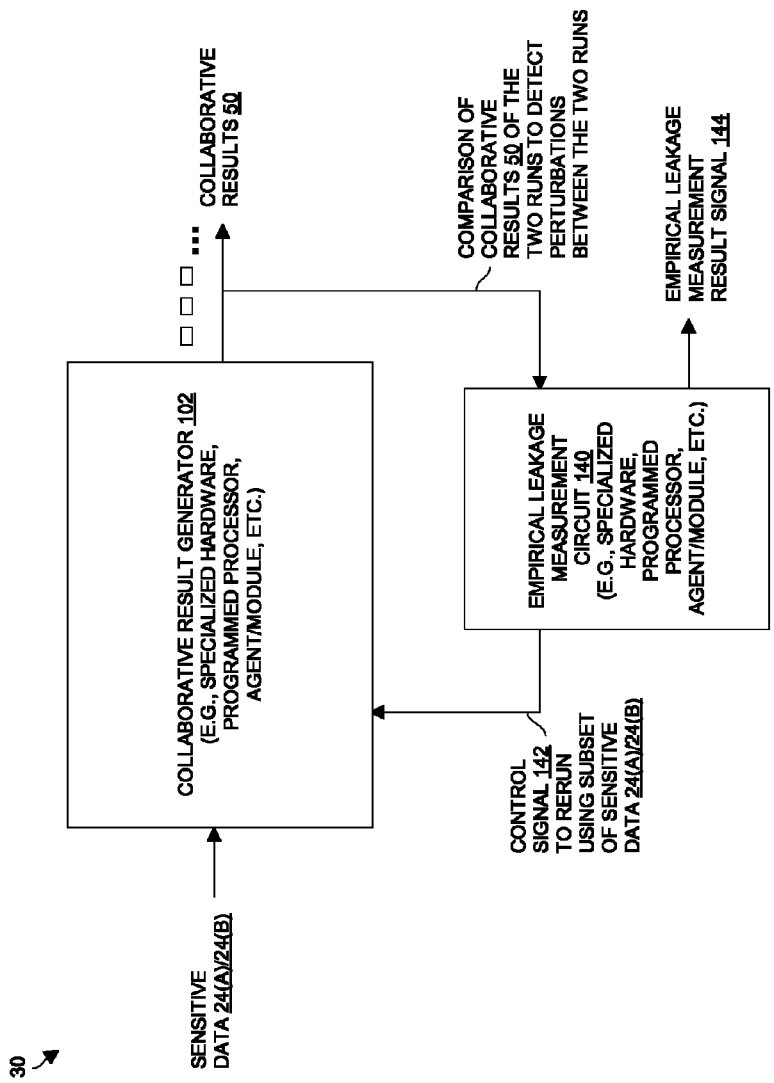
FIG. 5 is a block diagram illustrating an empirical leakage measurement operation performed by the electronic system of FIG. 1.

As shown in FIG. 5, the TCE device 30 includes a collaborative result generator 102 and an empirical leakage measurement circuit 140. The collaborative result generator 102 performs $f(D_A, D_B)$ to generate collaborative results 50 from $D_A$ and $D_B$ (see the sensitive data 24(A), 24(B) from Parties A and B). In particular, the collaborative result generator 102 generates the set of collaborative results 50 (e.g., assigns advertisements to customers) advertisements to customers) from $D_A$ and $D_B$ (e.g., on all customers).

Next, the empirical leakage measurement circuit 140 directs the collaborative result generator 102 to re-perform $f(D_A, D_B)$ on a subset of $D_A$ and $D_B$ (e.g., less than all of the customers), and compares the collaborative results 50 from the two runs. For example, if $D_A$ is a customer database, the empirical leakage measurement circuit 140 removes customer entries from $D_A$ perhaps one at a time, and reruns the collaborative result generator 102 on the smaller $D_A$ to determine whether any of the collaborations results 50 are different, i.e., see control signal 142 in FIG. 5. A perturbation in the collaborations results 50 in response to removal of a particular entry is an indication that the absence/presence of the particular entry in $D_A$ induces a different collaborative result 50 for another entry in $D_A$.

If the empirical leakage measurement circuit 140 determines that there are no significant perturbations in the collaborative results 50 (e.g., based on a predefined error threshold), the empirical leakage measurement circuit 140 outputs an empirical leakage measurement result signal 144 having a value which indicates compliance with the empirical leakage measurement policy. This outcome provides the parties with a level of assurance that the absence or presence of a particular entry in $D_A$ has not induced a different collaborative result 50 for another entry in $D_A$ (also see the policy compliance results 90 in FIG. 2).

However, if the empirical leakage measurement circuit 140 is unable to make that determination, the empirical leakage measurement circuit 140 outputs the empirical leakage measurement result signal 144 with a different value indicating that a breach of security may have occurred. In this situation, the TCE host may decide not to allow the parties to have access to the collaborative results 50 since one or more collaborative results 50 may include concealed sensitive data via perturbing one or more collaborative results 50.

In some arrangements, the empirical leakage measurement circuit 140 is implemented using specialized hardware. In other arrangements, the empirical leakage measurement circuit 140 is implemented using processing circuitry running a specialized set of instructions (e.g., see the computer program product 40 in FIG. 1).

Database Transformation

The electronic system 20 is equipped to perform data transformation operations to ensure that the collaborative results 50 are compliant with a data transformation policy (i.e., one of the pre-established safeguards 36). Along these lines, when the TCE device 30 performs $f(D_A, D_B)$ to generate the set of collaborative results 50, the TCE device 30 may not need to input highly precise data in order to obtain an effective output. Rather, one or both parties may perform data transformation operations to restrict certain information so that such precision is unavailable in the sensitive data, i.e., so that some details are at least partially filtered or masked in $D_A$ and/or $D_B$. Examples of such data transformation operations include generalizing an income or salary amount to an income range, masking out the last digit of a zip code, introducing noise such as changing the first or middle names in the sensitive data, suppressing or censoring whole data fields, and so on.

Figure 6:
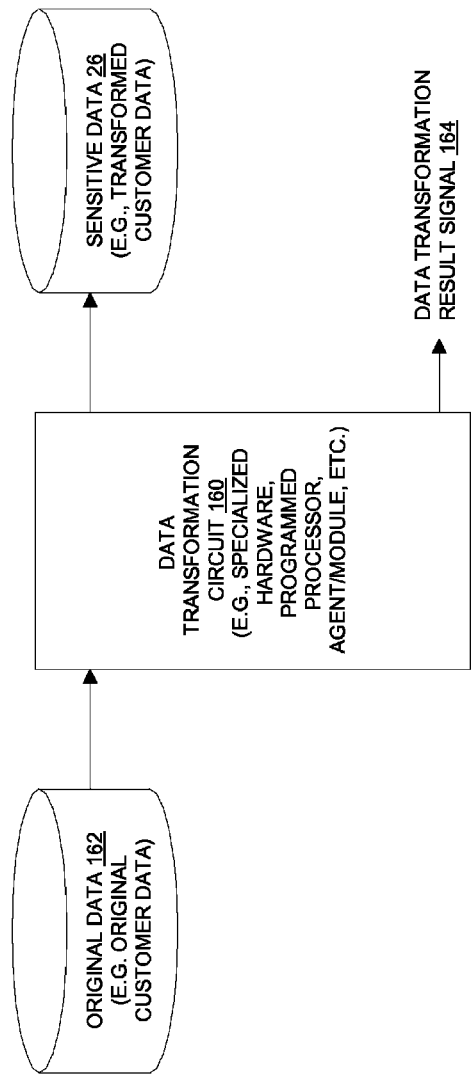
FIG. 6 is a block diagram illustrating a data transformation operation performed by the electronic system of FIG. 1.

As shown in FIG. 6, the electronic system 20 includes a data transformation circuit 160 which takes original data 162 as input (also see the original database 62 in FIG. 1), and provides sensitive data 26 for subsequent access by the TCE device 30. By way of example, the original data 162 is raw customer data amassed over time by a merchant, and the sensitive data 26 is a transformed version of the original data 162 containing less detail and with purposefully introduced noise to protect customer privacy. For instance, income information could be actual salary in the original data 162 but rounded into general increments of $25,000 in the sensitive data 26.

If the data transformation circuit 160 is successful in generating the sensitive data 26 from the original data 162, the data transformation circuit 160 outputs a data transformation result signal 164 having a value which indicates compliance with the data transformation policy. Otherwise, the data transformation circuit 160 outputs the data transformation result signal 164 with a different value indicating that a breach of security may have occurred. In this situation, the TCE Host may decide not begin processing the sensitive data 26 or prevent the parties from accesses to the collaborative results 50 since there was lack of compliance with the data transformation policy.

Further Details

Figure 7:
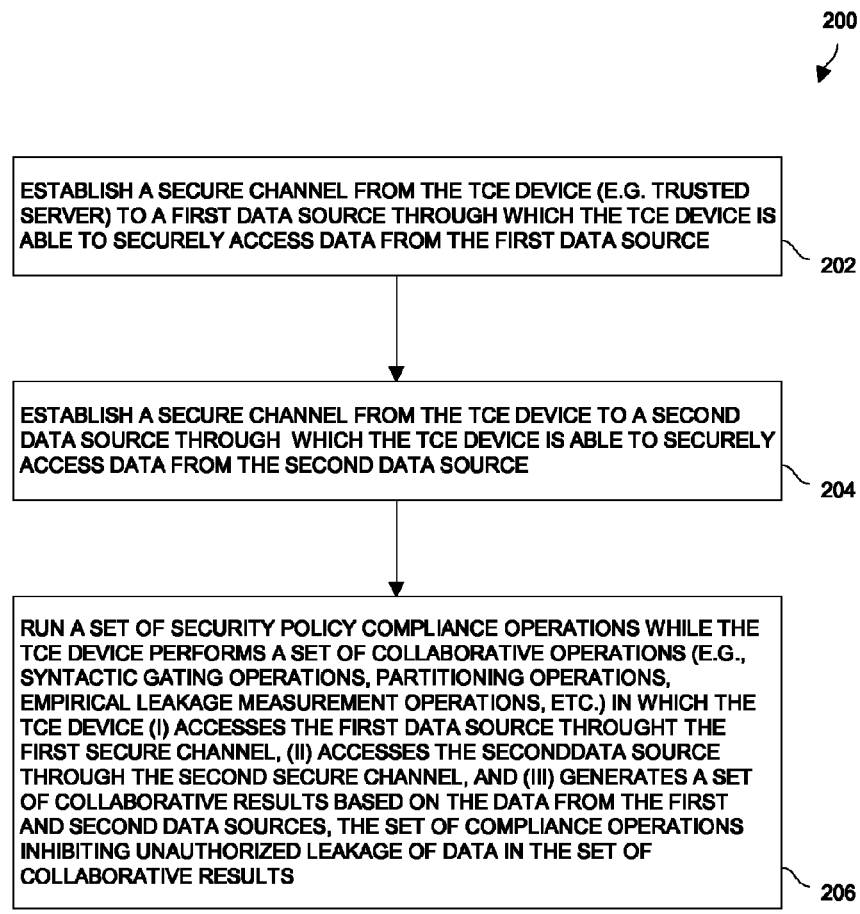
FIG. 7 is a flowchart of a procedure which is performed by the electronic system of FIG. 1.

FIG. 7 shows a flowchart of a procedure 200 which is performed by the electronic system 20 which inhibits data leakage between parties during collaboration. Reference is also made to FIGS. 1 and 2 which show particular details of the electronic system 20.

In step 202 of the procedure 200, the TCE device 30 establishes a first secure channel to a first data source. TCE device 30 is then able to use this first secure channel to securely access data from the first data source. For example, with reference to FIG. 1, the TCE device 30 establishes a secure channel 34(A) to the data source 24(A).

In step 204, the TCE device 30 establishes a second secure channel to a second data source. TCE device 30 is then able to use the second secure channel to securely access data from the second data source. Again, with reference to FIG. 1, the TCE device 30 establishes a secure channel 34(B) to the data source 24(B).

In step 206, the TCE device 30 runs a set of security policy compliance operations while the TCE device 30 performs a set of collaborative operations. For the collaborative operations, the TCE device 30 (i) accesses the first data source through the first secure channel (ii) accesses the second data source through the second secure channel, and (iii) generates a set of collaborative results 50 based on data from the first and second data sources. Performance of the set of security policy compliance operations by the TCE device 30 imposes the set of pre-established safeguards 36 (also see FIG. 1) to inhibit unauthorized leakage of data in a set of collaborative results 50, and provides the parties with a level of assurance that their sensitive data is protected. Further details will now be provided with reference to FIG. 8.

Figure 8:
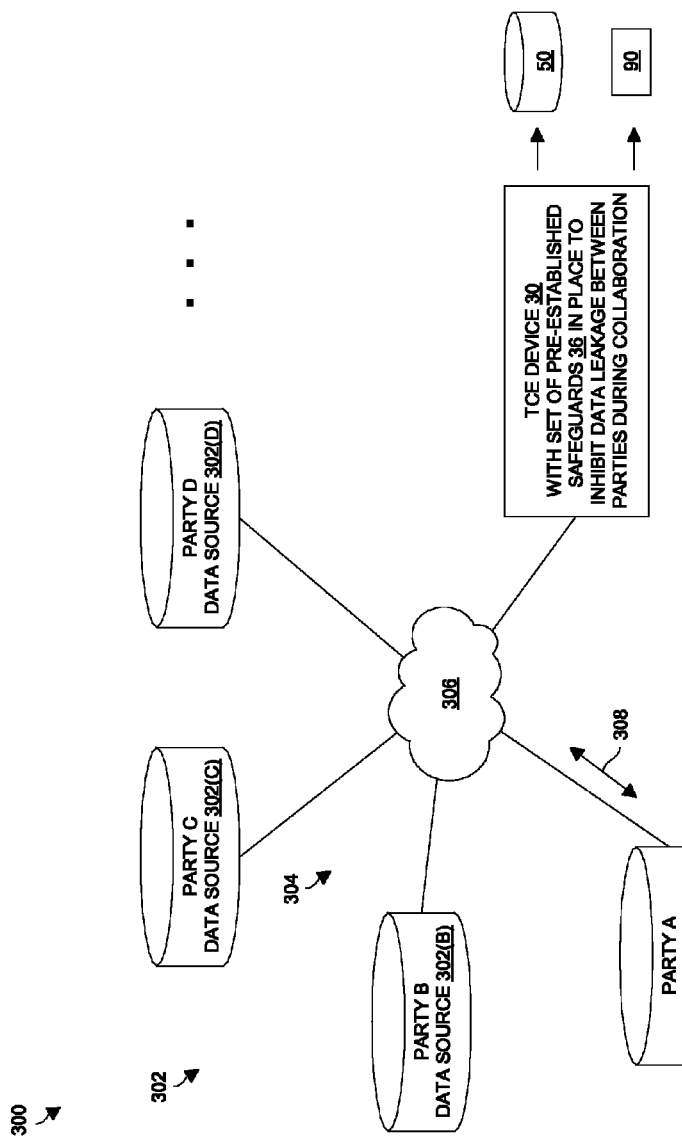
FIG. 8 is a block diagram of TCE which includes more than two parties.

FIG. 8 shows an electronic setting (or system) 300 which is suitable for use by the TCE device 30 when involving more than two parties. The electronic system 300 includes a data source 302(A) under control of Party A, a data source 302(B) under control of Party B, a data source 302(C) under control of Party C, a data source 302(D) under control of under control of Party D, and so on. Any number of separate data sources 302 is possible, and each data source 302 is locally operated and maintained by its respective party.

The electronic setting 300 further includes the TCE device 30 which is equipped with the set of pre-established safeguards 36. In some embodiments, the TCE device 30 is a server which is operated and maintained by a trusted third-party. Along these lines, it should be understood that the above-described architecture is capable of protecting the sensitive data from each of the various parties.

The electronic system 300 also includes a communications medium 304 which connects the TCE device 30 to each of the data sources 302. At least a portion of the communications medium 304 is illustrated as a cloud 306 to indicate that the communications medium 304 is capable of having a variety of different topologies including backbone, hub-and-spoke, loop, irregular, combinations thereof, and so on. Along these lines, the communications medium 304 may include copper-based devices and cabling, fiber optic devices and cabling, wireless devices, combinations thereof, and so on. Moreover, some portions of the communications medium 304 may include a computer network (e.g., the Internet, a LAN, a VPN, etc.) while other portions may include a different type of network (e.g., SAN hardware, etc.).

During operation, the TCE device 30 is capable of establishing a separate secure data channel 308 with each data source 302 (e.g., see the double arrow to data source 302(A)). Appropriate secure data communication mechanisms should be in place particularly when the communications medium 304 includes a public computer network. As a result, the TCE device 30 is able to securely access the sensitive data from each data source 302.

The appropriate secure channels 308 in place, the TCE device 30 is able to perform $f(D_A,D_B,D_C,D_D, \ldots)$ where (i) the output off is a set of collaborative results 50 and (ii) the output of cooperatively running pre-established safeguards 36 is a set of policy compliance results 90. In some embodiments, the set of policy compliance results 90 includes an electronic report indicating that each individual safeguard 36 was satisfied while generating the set of collaborative results 50 as well as a certification from the trusted trusted third-party.

It should be further understood that the electronic setting 300 allows for separate collaborative endeavors to occur without any changes to the physical infrastructure. For example, suppose that Party A is an advertising company and Party B, Party C and Party D are separate merchants which have independently hired the advertising company to analyze their confidential customer data and assign advertisements to their customers. In this example, the TCE device 30 is capable of running $f(D_A,D_B)$ to generate a first set of collaborative results 50 and an associated first set of policy compliance results 90 for use by Party B (i.e., advertisement assignments to customers of Party B). Additionally, the TCE device 30 is capable of separately running $f(D_A,D_C)$ to generate another set of collaborative results 50 and an associated set of policy compliance results 90 for use by Party C (i.e., advertisement assignments to customers of Party C). Furthermore, the TCE device 30 is capable of separately running $f(D_A,D_D)$ to generate yet another set of collaborative results 50 an associated set of policy compliance results 90 for use by Party D (i.e., advertisement assignments to customers of Party D).

Other combinations are available as well. For example, merchant Party B and merchant Party C could collaborate with advertising company Party A by sharing there sensitive data in activity defined by $f(D_A,D_B,D_C)$ to generate a set of collaborative results 50 which is useful to all parties. During this endeavor, the TCE device 30 provides a trusted execution environment which emits no non-negligible information about $D_A$, $D_B$, and $D_C$ except for $f(D_A,D_B,D_C)$ and all parties enjoy a level of assurance that their individual sensitive data remains protected.

As described above, improved techniques are directed to providing security-sensitive systems 20, 300 which allow multiple parties to work efficiently and effectively together with certain pre-established safeguards 36 in place to prevent unauthorized release of sensitive information from one party to another. Such safeguards 36 inhibit data leakage at a variety of levels and provide all parties with a high level of confidence that their sensitive information is secure. With such safeguards 36 in place, the parties are able to collaborate in a robust and reliable manner to generate a useful set of collaborative collaborative results 50 (e.g., promotions smartly assigned to customers).

While various embodiments of the invention have been particularly shown and described, it will be understood by those skilled in the art that various changes in form and details may be made therein without departing from the spirit and scope of the invention as defined by the appended claims.

For example, the TCE device 30 was described above in the context of a server controlled by a trusted third-party, i.e., a TCE Host. In other embodiments, the TCE device 30 is implemented as a component within a computerized system. For instance, in some arrangements, the various data sources reside in a common data storage array (or a distributed assembly) and the processing circuitry of the array runs a trustworthy software stack S as a TCE. In these arrangements, public keys can be associated with secure channels into the stack S, and $D_A$, $D_B$, . . . can be directly input into the execution environment. Such a configuration is a viable alternative to an embodiment which houses $D_A$, $D_B$, . . . in separate computing systems that individually authorize queries from a TCE-enabled server running S.

Additionally, it should be understood that the sensitive data need not be static. In some arrangements, at least one of the data sources 24, 302 provides streaming data. That is, in these arrangements, f operates over a set of inputs where at least one of the inputs is continuously changing and yielding data dynamically.

Furthermore, it should be understood that the systems 20, 300 were described above in the context of activity between a merchant and an advertising company by way of example only. Other applications are suitable as well. Along these lines, the systems 20, 300 are well suited for a variety of other data mining situations such as activities involving businesses, government agencies, and scientific organizations. Their diverse applications include targeted advertising and product recommendations, clinical trial studies in biomedical research, and intelligent analysis for policing, among many others. Moreover, as communication networks and data gathering technologies continue to spread and spread and mature, they will enhance existing data mining systems and give rise to new ones. Such modifications and enhancements are intended to belong to various embodiments.

What is claimed is:

1. A method of providing a security-sensitive environment, the method comprising:
 establishing a first secure channel from a trusted server to a first data source through which the trusted server is able to access the first data source;
 establishing a second secure channel from the trusted server to a second data source through which the trusted server is able to access the second data source; and
 while the trusted server performs a set of collaborative operations in which the trusted server (i) accesses the first data source through the first secure channel (ii) accesses the second data source through the second secure channel, and (iii) generates a set of collaborative results based on information from the first and second data sources, running a set of security policy compliance operations in the trusted server to inhibit unauthorized leakage of data in the set of collaborative results;
 wherein running the set of security policy compliance operations in the trusted server includes:
  partitioning the set of collaborative operations to un-correlate the set of collaborative results; and
 wherein partitioning the set of collaborative operations includes:
  while the trusted server performs the set of collaborative operations as a series, resetting the trusted server to an initial state between each collaborative operation to prevent formation of correlated data across multiple collaborative operations.

2. A method as in claim 1 wherein running the set of security policy compliance operations in the trusted server includes:
 performing a set of syntactic gating operations on the set of collaborative results, the set of syntactic gating operations being constructed and arranged to check for unauthorized explicit release of (i) first data from the first data source and (ii) second data from the second data source.

3. A method as in claim 2 wherein performing the set of syntactic gating operations includes:
 comparing each collaborative result of the set of collaborative results generated by the trusted server to a predefined format which is constructed and arranged to determine whether that collaborative result includes any unauthorized explicit release of (i) first data from the first data source and (ii) second data from the second data source.

4. A method as in claim 1 wherein the first data source includes a set of database entries; and
 wherein running the set of security policy compliance operations in the trusted server includes performing an empirical leakage measurement on the set of collaborative results generated by the trusted server to determine whether the set of collaborative results is heavily correlated to a particular database entry of the set of database entries.

5. A method as in claim 4 wherein the set of collaborative results is generated based on all of the database entries in the set; and
 wherein performing an empirical leakage measurement includes (i) generating additional collaborative results from a subset of the database entries, the subset of the database entries including less than all of the database entries in the set, and (ii) comparing the set of collaborative results and the additional collaborative results to identify whether perturbations exist between the set of collaborative results and the additional collaborative results.

6. A method as in claim 1, further comprising:
 prior to performing the set of collaborative operations, transforming information from an original database to produce the first data source.

7. A method as in claim 6 wherein the original database includes original database entries; and
 wherein transforming the information from the original database to produce the first data source includes obfuscating data in each original database entry to form, as the first data source, an obfuscated database of obfuscated database entries.

8. A method as in claim 1 wherein the first data source includes a user profile database of user profile entries, the user profile database being supplied by a first entity;
 wherein the second data source includes a target database of target entries, the target database being supplied by a second entity which is different than the first entity; and
 wherein performing the set of collaborative operations includes assigning respective target entries of the target database to the user profile entries of the user profile database.

9. A method as in claim 8 wherein the user profile database of user profile entries is a customer database supplied by a retailer;
 wherein the target database of target entries is an advertising database supplied by an advertising agency; and
 wherein assigning the respective target entries of the target database to the user profile entries of the user profile database includes pairing advertisements from the advertising database with customer identifiers from the customer database.

10. A method as in claim 1 wherein a set of predefined security policies defines the set of security policy compliance operations; and
 wherein the method further comprises:
  in response to running the set of security policy compliance operations in the trusted server to inhibit unauthorized leakage of data in the set of collaborative results, outputting a set of policy compliance results indicating whether each predefined security policy was satisfied.

11. A method as in claim 10 wherein outputting the set of policy compliance results includes issuing an electronic certificate indicating whether each predefined security policy was satisfied.

12. A method as in claim 11, further comprising:
 prior to performing the set of collaborative operations, transforming information from an original database to produce the first data source; and
 wherein running the set of security policy compliance operations in the trusted server includes:
  performing a set of syntactic gating operations on the set of collaborative results, the set of syntactic gating operations being constructed and arranged to check for unauthorized explicit release of (i) first data from the first data source and (ii) second data from the second data source,
  partitioning the set of collaborative operations to un-correlate the set of collaborative results, and performing an empirical leakage measurement on the set of collaborative results generated by the trusted server to determine whether the set of collaborative results is heavily correlated to a particular database entry of a set of database entries of the first data source.

13. A method as in claim 1 wherein generating the set of collaborative results based on information from the first and second data sources includes applying a set of data-mining algorithms to the information from the first and second data sources; and wherein the method further comprises:
preventing unauthorized release of the data-mining algorithms while generating the set of collaborative results.

14. A method as in claim 1 wherein the first data source provides streaming data which changes dynamically; and
wherein performing the set of collaborative operations includes generating the set of collaborative results based on the streaming data.

15. A security-sensitive platform, comprising:
a network interface constructed and arranged to establish a first secure channel to a first data source, and establish a second secure channel to a second data source;
memory; and
a controller coupled to the network interface and the memory, the controller being constructed and arranged to:
perform a set of collaborative operations by (i) accessing the first data source through the first secure channel (ii) accessing the second data source through the second secure channel, (iii) generating a set of collaborative results based on information from the first and second data sources, and (iv) storing the set of collaborative results in the memory, and
run a set of security policy compliance operations to inhibit unauthorized leakage of data in the set of collaborative results;
wherein the controller, when running the set of security policy compliance operations, is constructed and arranged to:
partition the set of collaborative operations to un-correlate the set of collaborative results; and
wherein the controller, when partitioning the set of collaborative operations, is constructed and arranged to:
while the controller performs the set of collaborative operations as a series, reset to an initial state between each collaborative operation to prevent formation of correlated data across multiple collaborative operations.

16. A security-sensitive platform as in claim 15 wherein a set of predefined security policies defines the set of security policy compliance operations; and wherein the controller is further constructed and arranged to:
in response to running the set of security policy compliance operations to inhibit unauthorized leakage of data in the set of collaborative results, output a set of policy compliance results indicating whether each predefined security policy was satisfied.

17. A security-sensitive platform as in claim 15 wherein the first data source includes a user profile database of user profile entries, the user profile database being supplied by a first entity;
wherein the second data source includes a target database of target entries, the target database being supplied by a second entity which is different than the first entity; and
wherein the controller, when performing the set of collaborative operations, is constructed and arranged to assign respective target entries of the target database to the user profile entries of the user profile database.

18. A computer program product for providing a security-sensitive platform, the computer program product including a non-transitory computer readable storage medium storing a set of instructions which, when carried out by a computer, cause the computer to:
establish a first secure channel to a first data source and a second secure channel to a second data source;
after establishing the first and second secure channels, perform a set of collaborative operations by (i) accessing the first data source through the first secure channel (ii) accessing the second data source through the second secure channel, and (iii) generating a set of collaborative results based on information from the first and second data sources; and
run a set of security policy compliance operations to inhibit unauthorized leakage of data in the set of collaborative results;
wherein the computer, when running the set of security policy compliance operations, is constructed and arranged to:
partition the set of collaborative operations to un-correlate the set of collaborative results; and
wherein the computer, when partitioning the set of collaborative operations, is constructed and arranged to:
while performing the set of collaborative operations as a series, reset to an initial state between each collaborative operation to prevent formation of correlated data across multiple collaborative operations.

19. A computer program product as in claim 18 wherein a set of predefined security policies defines the set of security policy compliance operations; and wherein the set of instructions further cause the computer to:
in response to running the set of security policy compliance operations to inhibit unauthorized leakage of data in the set of collaborative results, output a set of policy compliance results indicating whether each predefined security policy was satisfied.

20. A computer program product as in claim 18 wherein the first data source includes a user profile database of user profile entries, the user profile database being supplied by a first entity;
wherein the second data source includes a target database of target entries, the target database being supplied by a second entity which is different than the first entity; and
wherein the computer, when performing the set of collaborative operations, is constructed and arranged to assign respective target entries of the target database to the user profile entries of the user profile database.

21. A method of providing a security-sensitive environment, the method comprising:
establishing a first secure channel from a trusted server to a first data source through which the trusted server is able to access the first data source;
establishing a second secure channel from the trusted server to a second data source through which the trusted server is able to access the second data source; and
while the trusted server performs a set of collaborative operations in which the trusted server (i) accesses the first data source through the first secure channel (ii) accesses the second data source through the second secure channel, and (iii) generates a set of collaborative results based on information from the first and second data sources, running a set of security policy compliance operations in the trusted server to inhibit unauthorized leakage of data in the set of collaborative results;
wherein the first data source includes a set of database entries;
wherein running the set of security policy compliance operations in the trusted server includes performing an empirical leakage measurement on the set of collaborative results generated by the trusted server to determine whether the set of collaborative results is heavily correlated to a particular database entry of the set of database entries;

wherein the set of collaborative results is generated based on all of the database entries in the set; and wherein performing an empirical leakage measurement includes (i) generating additional collaborative results from a subset of the database entries, the subset of the database entries including less than all of the database entries in the set, and (ii) comparing the set of collaborative results and the additional collaborative results to identify whether perturbations exist between the set of collaborative results and the additional collaborative results.

22. A method of providing a security-sensitive environment, the method comprising:

establishing a first secure channel from a trusted server to a first data source through which the trusted server is able to access the first data source;

establishing a second secure channel from the trusted server to a second data source through which the trusted server is able to access the second data source; and while the trusted server performs a set of collaborative operations in which the trusted server (i) accesses the first data source through the first secure channel (ii) accesses the second data source through the second secure channel, and (iii) generates a set of collaborative results based on information from the first and second data sources, running a set of security policy compliance operations in the trusted server to inhibit unauthorized leakage of data in the set of collaborative results;

wherein the first data source includes a user profile database of user profile entries, the user profile database being supplied by a first entity;

wherein the second data source includes a target database of target entries, the target database being supplied by a second entity which is different than the first entity; and wherein performing the set of collaborative operations includes assigning respective target entries of the target database to the user profile entries of the user profile database.

23. A method as in claim 22 wherein the user profile database of user profile entries is a customer database supplied by a retailer;

wherein the target database of target entries is an advertising database supplied by an advertising agency; and wherein assigning the respective target entries of the target database to the user profile entries of the user profile database includes pairing advertisements from the advertising database with customer identifiers from the customer database.

24. A method of providing a security-sensitive environment, the method comprising:

establishing a first secure channel from a trusted server to a first data source through which the trusted server is able to access the first data source;

establishing a second secure channel from the trusted server to a second data source through which the trusted server is able to access the second data source; and while the trusted server performs a set of collaborative operations in which the trusted server (i) accesses the first data source through the first secure channel (ii) accesses the second data source through the second secure channel, and (iii) generates a set of collaborative results based on information from the first and second data sources, running a set of security policy compliance operations in the trusted server to inhibit unauthorized leakage of data in the set of collaborative results;

wherein a set of predefined security policies defines the set of security policy compliance operations; and wherein the method further comprises:

in response to running the set of security policy compliance operations in the trusted server to inhibit unauthorized leakage of data in the set of collaborative results, outputting a set of policy compliance results indicating whether each predefined security policy was satisfied;

wherein outputting the set of policy compliance results includes issuing an electronic certificate indicating whether each predefined security policy was satisfied; and wherein the method further comprises:

prior to performing the set of collaborative operations, transforming information from an original database to produce the first data source; and wherein running the set of security policy compliance operations in the trusted server includes:

performing a set of syntactic gating operations on the set of collaborative results, the set of syntactic gating operations being constructed and arranged to check for unauthorized explicit release of (i) first data from the first data source and (ii) second data from the second data source, partitioning the set of collaborative operations to un-correlate the set of collaborative results, and performing an empirical leakage measurement on the set of collaborative results generated by the trusted server to determine whether the set of collaborative results is heavily correlated to a particular database entry of a set of database entries of the first data source.

* * * * *